United States Patent
Welker

(10) Patent No.: US 6,250,330 B1
(45) Date of Patent: Jun. 26, 2001

(54) DIAPHRAGM REGULATOR WITH REMOVABLE DIFFUSER

(75) Inventor: Robert H. Welker, Washington, TX (US)

(73) Assignee: Welker Engineering Company, Sugar Land, TX (US)

( * ) Notice: Subject to any disclaimer, the term of this patent is extended or adjusted under 35 U.S.C. 154(b) by 0 days.

(21) Appl. No.: 09/435,984

(22) Filed: Nov. 8, 1999

(51) Int. Cl.$^7$ .......................... G05D 16/16; F16K 31/126; F16K 47/00
(52) U.S. Cl. ...................... 137/489; 137/625.3; 251/61.1; 251/118
(58) Field of Search ................................ 137/489, 625.3; 251/61.1, 118

(56) References Cited

U.S. PATENT DOCUMENTS

| | | |
|---|---|---|
| 3,776,278 | 12/1973 | Allen . |
| 3,917,222 | 11/1975 | Kay et al. . |
| 4,022,423 | 5/1977 | O'Connor et al. . |
| 4,068,683 | 1/1978 | Self . |
| 4,198,029 | * 4/1980 | Johnson ............................. 251/61.1 |
| 4,279,274 | 7/1981 | Seger . |
| 4,619,436 | * 10/1986 | Bonzer et al. ...................... 251/61.1 |
| 4,624,442 | * 11/1986 | Duffy et al. ......................... 251/61.1 |
| 5,271,601 | * 12/1993 | Bonzer et al. ...................... 251/61.1 |
| 5,307,830 | 5/1994 | Welker . |
| 5,454,640 | 10/1995 | Welker . |
| 5,730,416 | 3/1998 | Welker . |
| 5,769,388 | 6/1998 | Welker . |
| 5,909,747 | * 6/1999 | Schieber .......................... 251/61.1 X |
| 5,964,446 | * 10/1999 | Walton et al. .................... 251/61.1 X |

FOREIGN PATENT DOCUMENTS

| | | |
|---|---|---|
| 0 097 312 | 1/1984 | (FR) . |
| 59140973 | 8/1984 | (JP) . |

OTHER PUBLICATIONS

Fisher Control; "High Performance Control"; 1989 pp. 1–12.
Fisher–Rosemount; "Type 399A Pilot–Operated Pressure–Reducing Regulator," Bulletin 71.2:399A–161; 1996; pp. 1–24.
Fisher–Resomount; "Whisper Trim I Cage," Bulletin 80.1:106; 1997; p. 1.
Fisher–Rosemount; "Whisper Trim III Cages," Bulletin 80.1:010; 1997; pp. 1–4.
Fisher–Rosemont; "WhisperFlo Trim," 1997; pp. 1–10.
Fisher–Rosemount; "WhisperFlo Aerodynamic Atenuation Trims,"Bulletin 80.3:010; 1989; pp. 1–4.

(List continued on next page.)

*Primary Examiner*—Gerald A. Michalsky
(74) *Attorney, Agent, or Firm*—Blackwell Sanders Peper Martin

(57) ABSTRACT

The diaphragm regulator controls fluid pressure in downstream piping. The regulator may also be used as an on/off valve, although this is not its primary application. A central circular housing in the body of the regulator receives a removable flow diffuser to reduce turbulence when fluid is flowing from the inlet port to the outlet port of the regulator. The flow diffuser has a flat circular base with an inlet zone in the center and a plurality of vanes extending from the inlet zone to the outer circumference of the base. These vanes are spaced apart and define a plurality of flow passageways permitting fluid to flow from the inlet port, through the inlet zone, through the passageways, through the transition zone and exit the outlet port. Each vane has a flat upper surface parallel with the base and an inclined surface sloping downward from the flat upper surface to the inlet zone. When the regulator is in the closed position, the diaphragm contacts the inclined surfaces of the vanes and engages a seat at the base of the flow diffuser. The angle of the inclined surface is complimentary to the angle of the diaphragm when it is contacting the seat. In an alternative embodiment, the flow diffuser has a recess that receives a flow restriction element.

6 Claims, 8 Drawing Sheets

OTHER PUBLICATIONS

Pipe Line & Gas Industry magazine; "New gas–pressure regulator blends featurs of boots, plugs"; 1999; pp. 59–71.

Fisher–Rosemount; "Type EZR Pressure Reducing Regulator," Bulletin 71.2:EZR; 1999; pp. 1–24.

Fisher Controls; "Cavitrol V Trim," Bulletin 80.2:020; 1979; pp. 1–4.

Fisher–Rosemount; "Cavitrol III One–Stage Trim," Bulletin 80.2:010; 1997; pp. 1–6.

AmericanMeter Company; "Radkal Flow Valves"; 1997; pp. 1–6.

Mooney Controls; "2–Flanged Single Port Flowgrid Valve"; 1991; pp. 1–6.

* cited by examiner

DIAPHRAGM REGULATOR WITH REMOVABLE DIFFUSER

BACKGROUND OF THE INVENTION

1 Field of the Invention

The present invention relates to a diaphragm regulator with a removable diffuser.

2. Description of the Related Art

Many industries, including the oil and gas industry, require regulators for controlling the pressure and flow of fluids. It is customary to install regulators in parallel so that if one fails, the other will take over to maintain flow to the user. One of the more common regulator designs includes a diaphragm located at the end of a vertically aligned piston. In order for a horizontally oriented pipeline to make use of the regulator, the fluid is initially directed downward and then back up past a seat. The fluid must then be directed back to the original horizontal direction. This sudden change in flow direction causes turbulent flow patterns.

Turbulent flow poses several problems. It can cause impingement resulting in damage to the regulator and the surrounding sections of pipeline. Additionally, turbulent flow can cause a great deal of noise. Some of these problems have been addressed previously, in U.S. Pat. No. 3,900,475 to Myers for a low noise valve trim.

The present inventor has addressed the issue of turbulence and noise in a poppet style control valve in U.S. Pat. No. 5,769,388 which includes a flow diffuser with a plurality of vanes. U.S. Pat. No. 5,769,388 is incorporated herein by reference in its entirety. In addition, the present inventor has developed a 90° elbow which includes a plurality of vanes to reduce turbulence and encourage laminar flow in a U.S. patent application that was filed on Jul. 23, 1999, serial number 09/360,424, entitled Flow Diffuser.

The present inventor has also addressed the issue of turbulence reduction in U.S. Pat. No. 5,307,830 which includes a plurality of tubes downstream of a valve. A similar tubular arrangement has been used to redistribute stratified liquids in a pipeline in U.S. Pat. No. 5,454,640. This tubular design has also been used by the present inventor to reduce turbulence in flow regulators and valves in U.S. Pat. No. 5,730,416 and U.S. patent application Ser. No. 09/035,559 filed on Mar. 5, 1998, now U.S. Pat. No. 5,924,673.

The problem of aerodynamic noise in pilot operated pressure reducing regulators has been recognized in the industry for many years and a number of other approaches have been developed to address the problem. For example, Fisher® has sold the Whisper Trim® cage in an attempt to reduce operating noise levels in valves and regulators that control gas, vapor or steam. Included in the Information Disclosure Statement ("IDS") filed concurrently herewith, is a copy of a Fisher advertising brochure entitled "High-Performance Control." A photograph of a Whisper Trim cage is shown on page 6 thereof. Also included in the IDS is a copy of Fisher Bulletin 71.2:399A-161 entitled "Type 399A Pilot-Operated Pressure-Reducing Regulator", which includes a photograph of a different Whisper Trim cage on page 4 thereof. Fisher Bulletin 80.1:006 entitled "Whisper Trim I Cage" is also included with the IDS. The Whisper Trim I Cage includes a plurality of slits arranged radially in the cage. Yet another Fisher cage design is shown in Bulletin 80.1:010 entitled "Whisper Trim III Cages" which is also included in the IDS. The Whisper Trim III uses a multi-hole pattern arranged radially in the cage.

In addition to the Whisper Trim line, Fisher also has marketed the Whisper Flo™ trim for use in valves that control gas, vapor or steam. The Whisper Flo has a multi-path multistage design as shown in the advertising brochure entitled "Whisper Flo Trim" included in the IDS. This advertising literature claims that aerodynamic noise is reduced by as much as 40 dBA and that this surpasses conventional noise reducing trims by 5 to 10 dBA. Also included in the IDS is Fisher Bulletin 80.3:010 showing the Whisper Flow Trim.

Recently Fisher introduced the Type EZR device to reduce noise in boot and plug regulators. The term boot and plug appears to be a term used by Fisher to describe a regulator that applicant describes as a diaphragm regulator. Also in the IDS is a reprint from the May 1999 *Pipe Line & Gas Industry* magazine that shows the metal plug used in this product. The EZR device also uses a flow cage with a plurality of radial slits. Additional photos of this cage are shown on pages 1–3 of Fisher Bulletin 71.2:EZR included in the IDS.

For many years, Fisher has offered the CAVITROL® trim for use with valves that control fluids. Older versions shown in Fisher Bulletin 80.2:020, included in the IDS, use a multi-tube design. The Cavitrol III one-stage trim shown on Fisher Bulletin 80.2:010, included in the IDS, uses a multi-hole design, which appears similar to the Whisper Trim III cage design in Fisher Bulletin 80.1:010.

Other cage designs are used in the industry. For example, the American Meter Company sells RFV™ radial flow valves which are pilot-operated diaphragm regulators used for pressure regulation, overpressure relief, flow control or for on/off applications. Also in the IDS is an advertisement from American Meter which shows a picture on page 3 of the trim cages offered in conjunction with the RFV valves.

Some diaphragm regulators have a plate or cage with struts or a grid to support the diaphragm. For example, Mooney Controls uses a throttling plate shown on the front plate of its advertising brochure, a copy of which is included in the IDS.

Patent abstracts of Japan, Publication Number 59140973, Application Number 58013899, a copy of which is included in the IDS, discloses a valve with a comblike cylinder comprising a plurality of square pillar-like members to supposedly reduce noise. These square pillars are counter productive to reduction of turbulence and noise and differ from the streamlined curvilinear vanes of the present invention. U.S. Pat. No. 4,022,423 discloses a control valve with streamlined vanes, but they are designed for rotation under the flow of fluid, to impart rotational movement to a shaft.

These and other types of cages and trims have been used in an attempt to reduce turbulence, impingement and aerodynamic noise in valves and pressure regulators. There is still a need for devices that further reduce turbulence, impingement and noise and produce laminar flow as the fluid exits the regulator.

It is thus an object of this invention to provide a flow diffuser for a diaphragm regulator that produces laminar flow patterns in the fluid upon exiting the valve trim.

It is a further object of this invention to provide a flow diffuser for a diaphragm regulator that reduces impingement and abrasive cutting upon the diaphragm regulator and the surrounding pipeline, thus extending the life of the regulator.

It is a further object of this invention to provide a flow diffuser for a diaphragm regulator that reduces the energy loss in the flow, thus reducing the cost of moving the fluid through the valve.

It is yet a further object of this invention to provide a flow diffuser for a diaphragm regulator that limits the noise caused by the flow through the valve.

Other objects of the invention will become apparent from the specification described herein below.

SUMMARY OF THE INVENTION

In accordance with the objects listed above, the present invention is a diaphragm regulator with removable flow diffuser that produces substantially laminar flow patterns in the fluid upon exiting the regulator, thus reducing turbulence. The removable diffuser consists of a body configured to be placed in the valve housing, and in the preferred embodiment is a disk shaped body that has an axial inlet opening. The flow is then diverted through a plurality of outlet passages, some of which are curvilinear. The walls of the outlet passages are defined by a series of vanes within the diffuser body. The vanes are curved in such a manner as to cause the outlet passages to converge upon exiting the diffuser, thereby restoring substantially laminar flow.

In one form thereof, the present flow diffuser has sixteen (16) outlet passages. To achieve a substantially laminar flow upon exiting, each passage is preferably the same width at the start, the total combined width of all the outlet passages at the start should be equal to or approximately equal to the circumference of the pipe being used in conjunction with the regulator. For example, a two-inch regulator designed to handle 600 psig pressure might have sixteen outlet passages and each passage should be approximately 0.382 inches wide at the start. The vanes, which also serve as a grid to support the diaphragm, would have a spacing suitable for supporting the diaphragm with a maximum pressure drop across it. As another example, a regulator designed to handle a 1000 psig pressure might have 20 vanes, but could have more or less.

The diaphragm has a generally conical shape and the tops of the vanes are angled to conform to the shape of the diaphragm. The vanes are shaped such that each outlet passage will converge with the adjacent outlet passage. Upon exiting the diffuser, all of the outlet passages have converged thereby producing a substantially laminar flow.

In the preferred embodiment, a transition zone is also included, which extends from the exit of the diffuser to the outlet port of the regulator. The transition zone has a rectangular cross-section at the end proximate the flow diffuser, where the outlet passages converge. At that point, the height of the transition zone is equal to the height of the outlet passages of the flow diffuser and the width of the transition zone is equal to the total combined width of all the outlet passages of the flow diffuser. As the transition zone approaches the outlet port of the diaphragm regulator, it simultaneously expands in height, narrows in width, and gradually and smoothly changes shape until the cross-section is circular just as it reaches the outlet port of the diaphragm regulator. The cross-sectional area of the transition zone is constant the entire way therethrough.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and are therefore not to be considered limiting of its scope, for the invention may admit to other equally effective embodiments. Reference the appending drawings, wherein.

DETAILED DESCRIPTION OF THE INVENTION

Figure 1:
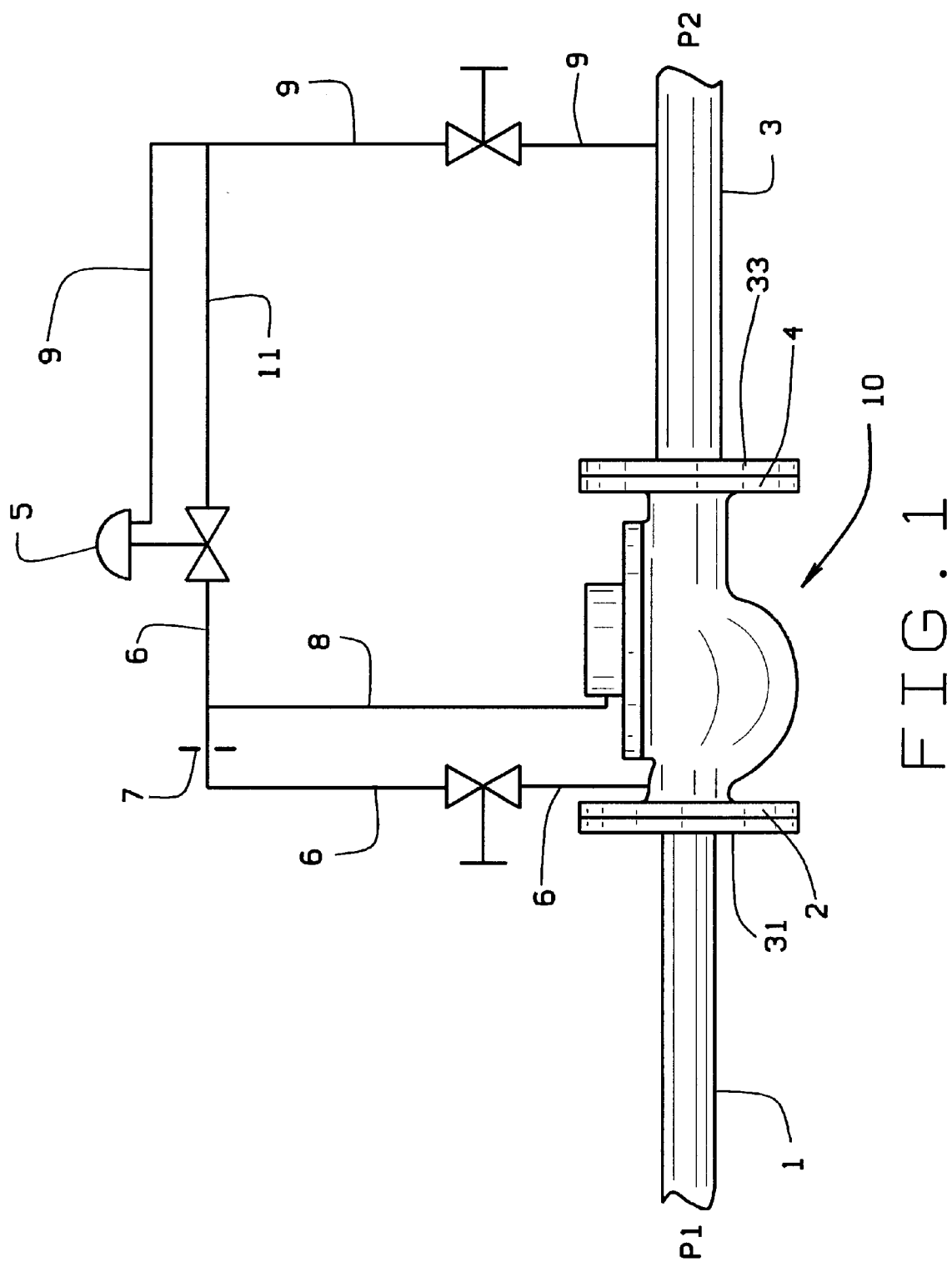
FIG. 1 is a schematic view of the diaphragm regulator in a pipeline with pilot and associated piping and valves.

In FIG. 1, a diaphragm regulator is generally identified by the numeral 10. The diaphragm regulator 10 is connected to an upstream pipe 1 and flange 31 by a flange 2 and a bolt circle (not shown). The diaphragm regulator 10 is also connected to a downstream pipe 3 and flange 33 by a flange 4 and a bolt circle (not shown). The primary purpose of the diaphragm regulator 10 is to regulate the pressure in the downstream pipe 3. In a typical situation, the pressure P1 in the upstream pipe 1 is greater than the pressure P2 in the downstream pipe 3. The need to regulate pressure occurs, for example when gas is flowing from a transmission pipeline into distribution lines at a city gate or industrial plant. The primary application for this system is pressure regulation, but with a suitable pilot system and sense points, the diaphragm regulator 10 can also be used for over-pressure relief, on/off applications or monitor service.

The diaphragm regulator 10 is controlled by a pilot 5. Pilot control of diaphragm regulators is well known to those skilled in the art. Included in the IDS filed concurrently herewith is Fisher Bulletin 71.2:EZR. On page 6 of this bulletin, a diaphragm regulator and pilot are shown. Other pilot-regulator configurations are shown in this Fisher-Bulletin at pages 10, 11,15, 16 and 17.

The pilot system shown in FIG. 1 is perhaps one of the more common control systems used in the industry in a pressure regulation application and is sometimes referred to as "downstream pressure control". A supply line 6 connects the pilot 5 to the upstream pressure side of the diaphragm regulator 10. A restriction orifice 7 is located in the supply line 6 between the diaphragm regulator 10 and the pilot 5. An intermediate pressure line 8 runs from the dome of the diaphragm regulator 10 to the supply line 6, but connects at a point between the restriction orifice 7 and the pilot 5. A sense line 9 connects the pilot 5 to the downstream pipeline 3 and allows the pilot 5 to sense downstream pressure P2. A downstream bleed line 11 allows the pilot 5 to bleed into the downstream pipe 3 via the sense line 9. To facilitate installation and maintenance valves may be placed in the various lines as shown in the drawing.

During typical operation of the diaphragm regulator 10, it is continuously in the open position and the diaphragm 20 modulates up and down to regulate the downstream pressure P2. However, if it is necessary to close the diaphragm regulator 10, the spring tension in the pilot 5 can be reduced, thus closing the poppet (not shown) in the pilot 5. When the poppet in the pilot 5 closes, the pressure in the supply line 6 equalizes with the pressure in the intermediate pressure line 8. The main spring 30 in the diaphragm regulator 10 thus closes the diaphragm 20 against the seat 22 stopping any flow through the diaphragm regulator 10.

To open the diaphragm regulator 10, spring tension is increased in the pilot 5 thus opening the poppet (not shown) in the pilot 5. When the poppet in the pilot 5 is open the pressure in the supply line 6 is greater than the pressure in the intermediate line 8 because it is bleeding back through the pilot and the bleed line 11 into the downstream pipe 3. When the pressure behind the diaphragm is less than upstream pressure P1, the upstream pressure overcomes the downward force of the main spring 30 and raises the diaphragm 20 from its seat 22 allowing flow through the diaphragm to the downstream pipe 3. As known to those skilled in the art, the diaphragm regulator 10 is open during normal pipeline operations and the pilot 5 is constantly controlling the position of the diaphragm 20 to maintain the downstream pressure P2 in a more or less constant state.

Figure 2:
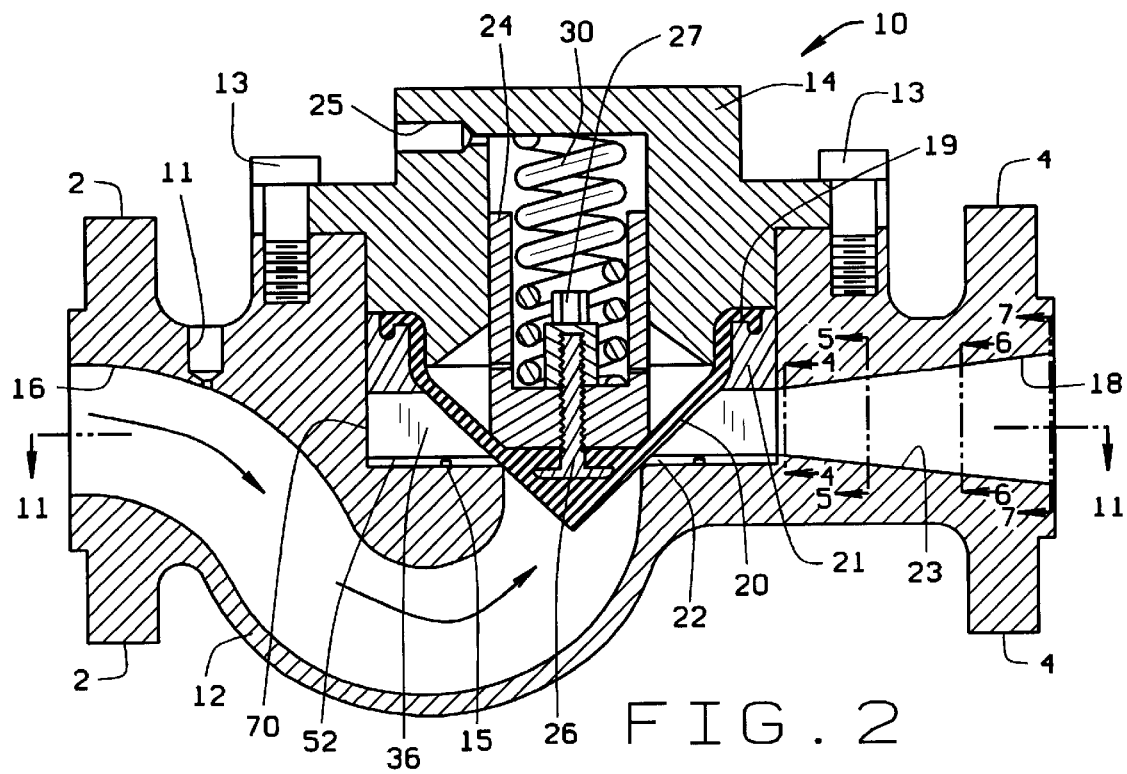
FIG. 2 is a section view of the a removable flow diffuser in a "straight-through" diaphragm regulator with the regulator in the closed position.

Referring now to FIG. 2, a diaphragm regulator 10 is shown in section view. In this Figure, the diaphragm regulator 10 is shown in the closed or no-flow position. The diaphragm regulator 10 comprises a body 12, a dome 14 with an inlet port 16, a transition zone 23 and an outlet port 18. The body 12 defines a circular housing 70 that receives a removable diffuser 36. The dome 14 is secured to the body by a plurality of bolts 13. An elastomeric diaphragm 20 engages a seat 22 thus preventing the flow of fluid from the inlet port 16 to the outlet port 18 when the regulator is closed. The diaphragm 20, which may be reinforced, is secured at its apex to a moveable piston 24 by a screw 26 and a nut 27. The diaphragm 20 may be reinforced with suitable material such as nylon or other fibers. At its perimeter 19, the diaphragm 20 is mechanically gripped between the dome 14 and the collar 21. As shown in FIG. 2, the spring 30 urges the diaphragm 20 into sealing engagement with the seat 22.

As shown in FIG. 2, the piston 24 has a larger outside diameter than the diameter A of the inlet 25. The diameter A is the nominal size of the regulator. This arrangement mechanically prevents the piston from shoving the diaphragm 20 into the inlet 25. The diffuser 36 has a flat base 52 and a circular o-ring groove 15 formed on the bottom of the base 52. The o-ring groove 15 has a diameter which is larger than the diameter of the inlet 25. An o-ring 17 fits in the groove 15 and forms a seal between the diffuser 36 and the housing 70 of body 12, thus forcing fluid to flow from the inlet 25 through the diffuser 36, to the transition zone 23 and exit the outlet port 18.

The supply line 6 in FIG. 1 connects to the supply line port II in the body 12 of the diaphragm regulator 10. The supply line 6 conveys upstream pressure P1 to the pilot 5. The intermediate pressure line 8 connects to the intermediate pressure line port 25 in the dome 14.

Figure 3:
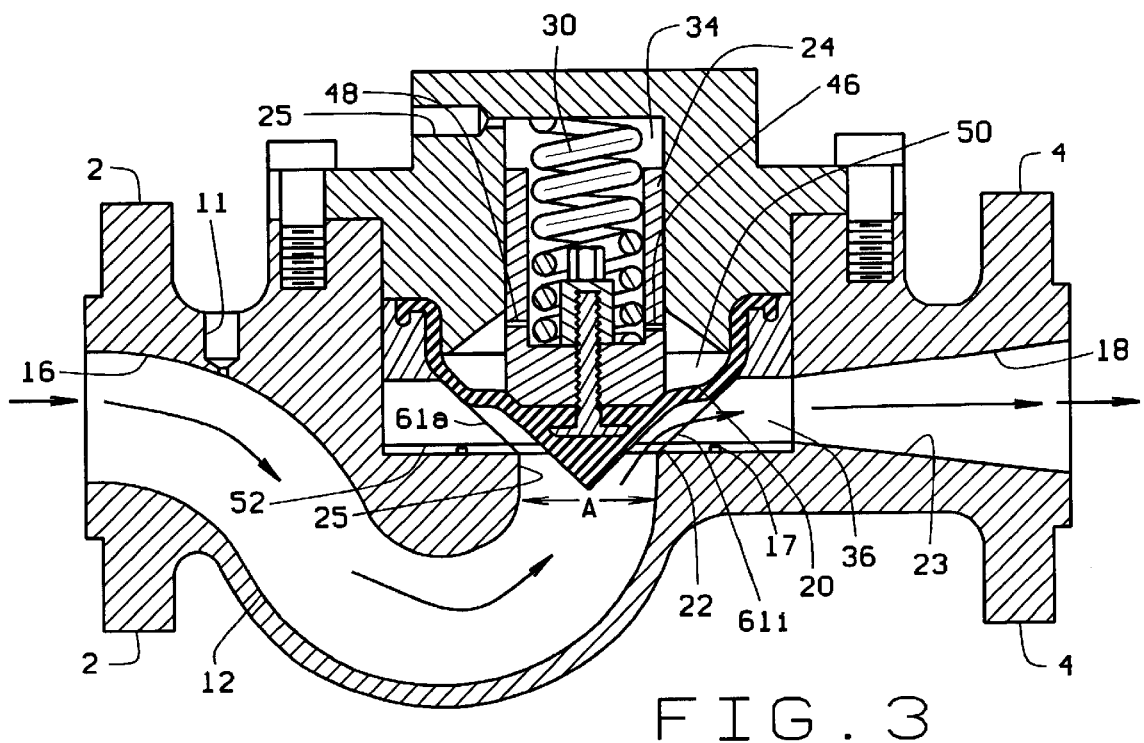
FIG. 3 is a section view of the removable flow diffuser of FIG. 1 in a "straight through" diaphragm regulator with the regulator in the open position.

FIG. 3 shows the regulator 10 in the open position with fluid flowing from the inlet port 16 past the seat 22 through the flow diffuser 36 into the transition zone 23 to the outlet port 18 as shown by the flow arrows. The downstream pressure P2 is regulated by movement up and down of the diaphragm 20. A plurality of apertures 46 and 48 are formed in the piston 24 and are in fluid communication with the dome chamber 34 and the diaphragm chamber 50. When the pressure in the diaphragm chamber 50 is less than the upstream pressure P1, the upstream pressure overcomes the force of spring 30 and lifts the diaphragm 20 off the seat 22. Although many different springs may be used depending on the application, it is common to use springs with a force of 10 pounds when the upstream pressure P1 is above 50 psi. If upstream pressure P1 is less than 50 psi the spring might have a force no greater than 10 percent of such upstream pressure. For example, an upstream pressure of 25 psi might require a spring with 2.5 pounds of force.

Figure 4:
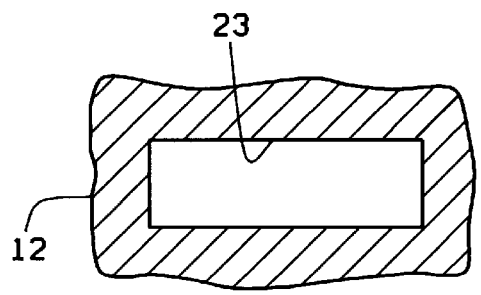
FIG. 4 is a cross-section view of the transition zone of the present diaphragm regulator along line 4—4 of FIG. 1 proximate to the flow diffuser.

In FIG. 4, a section view of the transition zone 23 is shown along the line 4—4 of FIG. 2. At this position, the transition zone 23 is formed as a rectangle immediately adjacent to flow diffuser 36. At this point, the height of the transition zone 23 is equal to the height of the outlet passages of the flow diffuser 21 and the width of the transition zone 23 is equal to the total combined width of all the outlet passages of the flow diffuser. As the transition zone approaches the outlet port 18 of the diaphragm regulator 10, it simultaneously expands in height, narrows in width, and gradually and smoothly changes shape until the cross-section is circular just as it reaches the outlet port of the diaphragm regulator.

Figure 5:
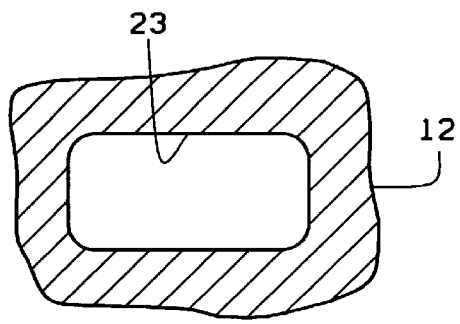
FIG. 5 is a cross-section view of the transition zone of the present diaphragm regulator along line 5—5 of FIG. 1, approximately one-third of the way from the flow diffuser to the outlet port.

FIG. 5 is a section view of the transition zone 23 along the line 5—5 of FIG. 2. The transition zone 23 has changed from the rectangle of FIG. 4 to a polygonal shape shown in this drawing.

Figure 6:
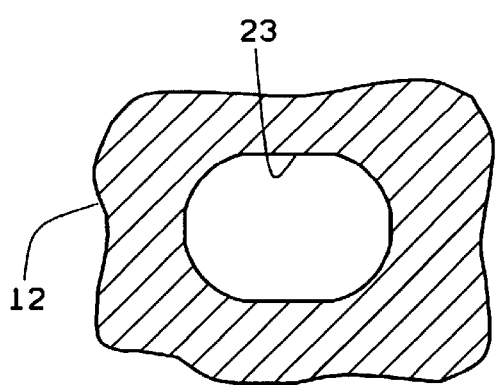
FIG. 6 is a cross-section view of the transition zone of the present diaphragm regulator along line 6—6 of FIG. 1 approximately two-thirds of the way from the flow diffuser to the outlet port.

FIG. 6 is a section view of the transition zone 23 along the line 6—6 of FIG. 2. The shape of the transition zone 23 is changing and is progressing more towards a circular shape to condition the flow as it leaves the valve and enters the pipeline.

Figure 7:
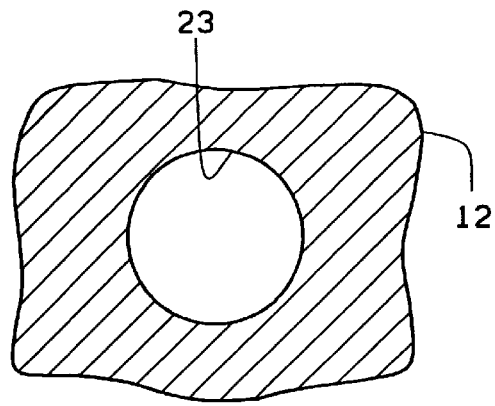
FIG. 7 is a cross-section view of the transition zone of the present diaphragm regulator along line 7—7 of FIG. 1 proximate to the outlet port.

FIG. 7 is a section view of the transition zone 23 along the line 7—7 of FIG. 2. The shape of the transition zone 23 immediately adjacent to flange 4 is circular. The diameter of the circular outlet port is equal to the diameter A of the inlet 25. The cross sectional area of the transition zone 23 remains constant in FIGS. 4, 5, 6 and 7.

Figure 8:
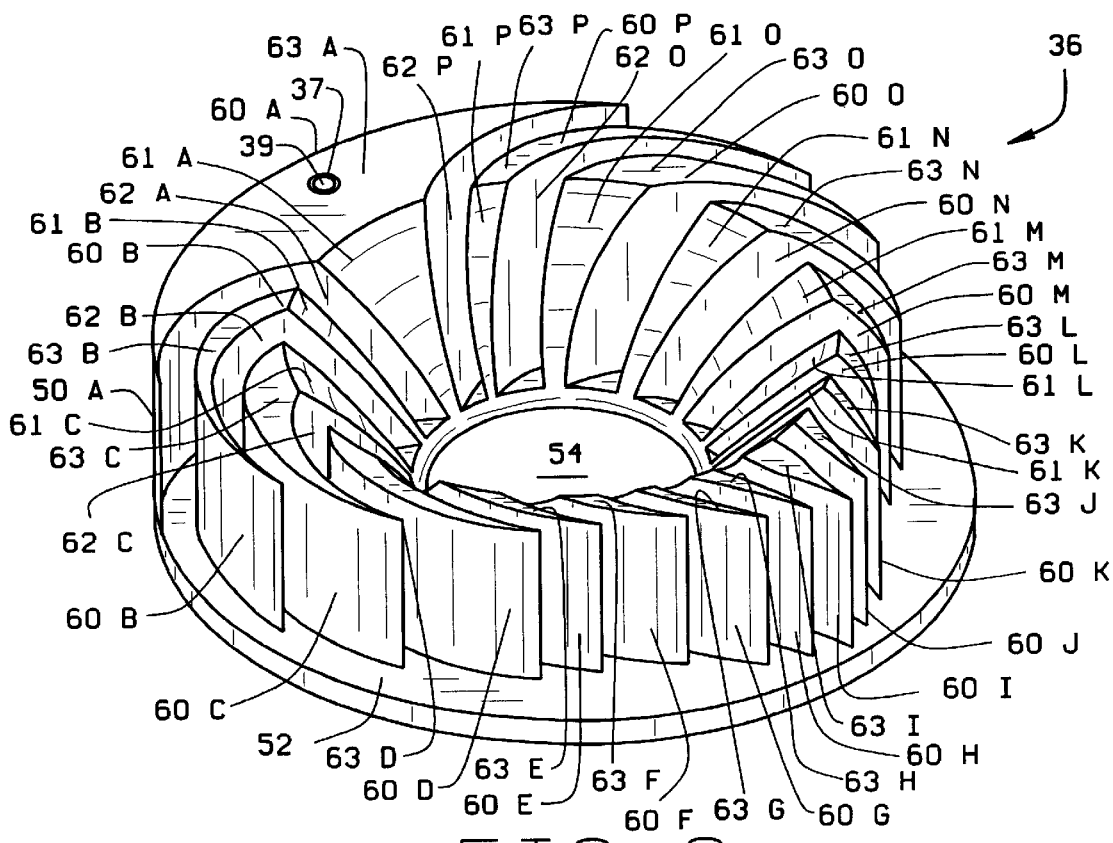
FIG. 8 is a perspective view of the removable flow diffuser.

FIG. 8 is a perspective view of the removable flow diffuser 36. The flow diffuser 36 includes a base 52. Each vane 60a–60p includes a flat upper surface 63a–63p that is coplanar with the base 52 and an inclined surface 61a–61p that supports the lower surface of the diaphragm 20. The angle of incline of the surfaces 61a–61p can be between 30° and 50° but is largely a matter of manufacturing convenience depending on the size of the regulator and the design of the diaphragm 20. In the preferred embodiment, an angle of 45° is shown. However, other angles are within the scope of this invention.

The flow diffuser 36 includes a plurality of vanes 60a–60p and a plurality of passageways 62a–62p. The vanes 60a–60p extend from and are joined to the base 52. The inclined surfaces 61a–61p of the vanes 60a–60p are angled downward towards the inlet zone 54 at an angle that is the same as the angle of the diaphragm 20 when in the closed position.

The rear vane 60a has a vertical aperture 37 that passes entirely through the vane 60a and the base 52. The aperture 37 is sized and arranged to receive and engage an alignment pin 39 that properly orients the diffuser 36 and the passageways 62a–p towards the transition zone 23. The alignment pin 39 is mounted in the body 12 and extends into the circular housing 70. When the diffuser 36 is put in the circular housing 70, the aperture 37 must be property positioned over the alignment pin 39 so the pin 39 can slip into the aperture 37. When the pin 39 and the aperture 37 are properly aligned, the diffuser 36 slips in to the housing 70 and the base plate 52 lays flat against the bottom of the housing 70 of body 12, as shown in FIGS. 2 and 3.

Figure 9:
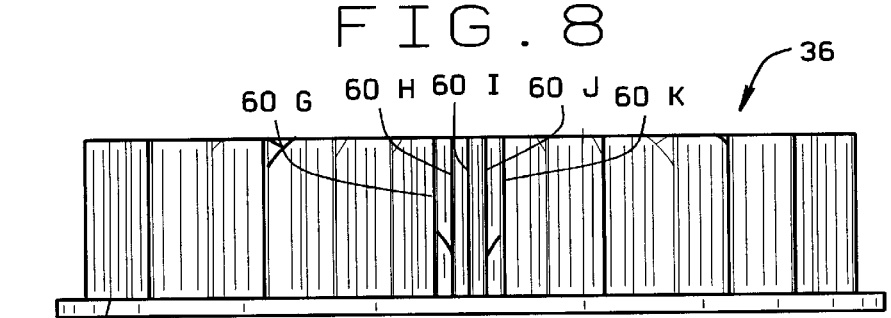
FIG. 9 is an elevation view of the removable flow diffuser proximate the transition zone.

FIG. 9 is an elevation view of the flow diffuser 36 from the transition zone 23. The center vane 60i is located in the center of this drawing. The first vane to the left of the center vane is 60h and the first vane to the right of the center vane is 60j.

Figure 10:
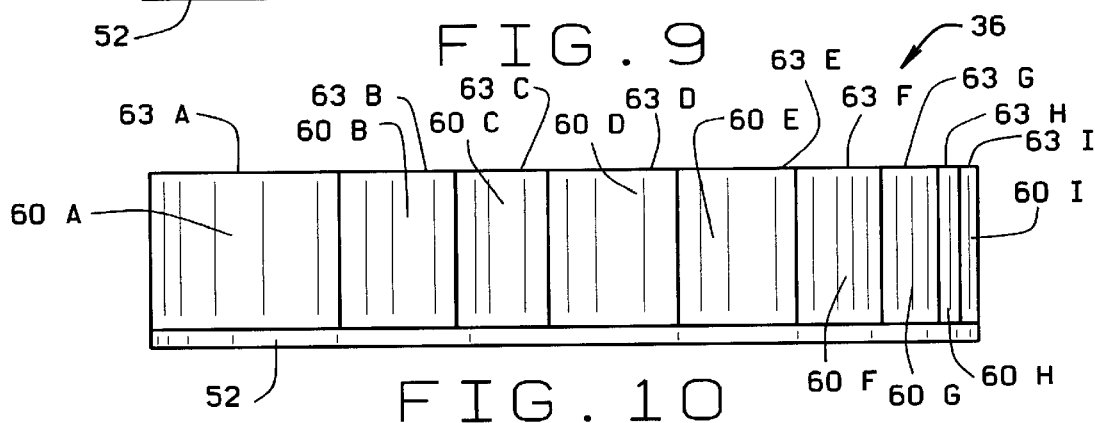
FIG. 10 is a side elevation view of the removable flow diffuser rotated 90° counterclockwise from the view in FIG. 9.

FIG. 10 is an elevation view of the flow diffuser 36 rotated 90 degrees counter-clockwise from the view in FIG. 9. The rear vane 60a appears to the left side of the drawing and the center vane 60i appears to the immediate right side of the drawing. The other vanes 60–60h appear sequentially. Each van has a flat upper surface 63a–63i. The base 52 of the diffuser 36 is coplanar with the upper surfaces 63a–63i.

Figure 11:
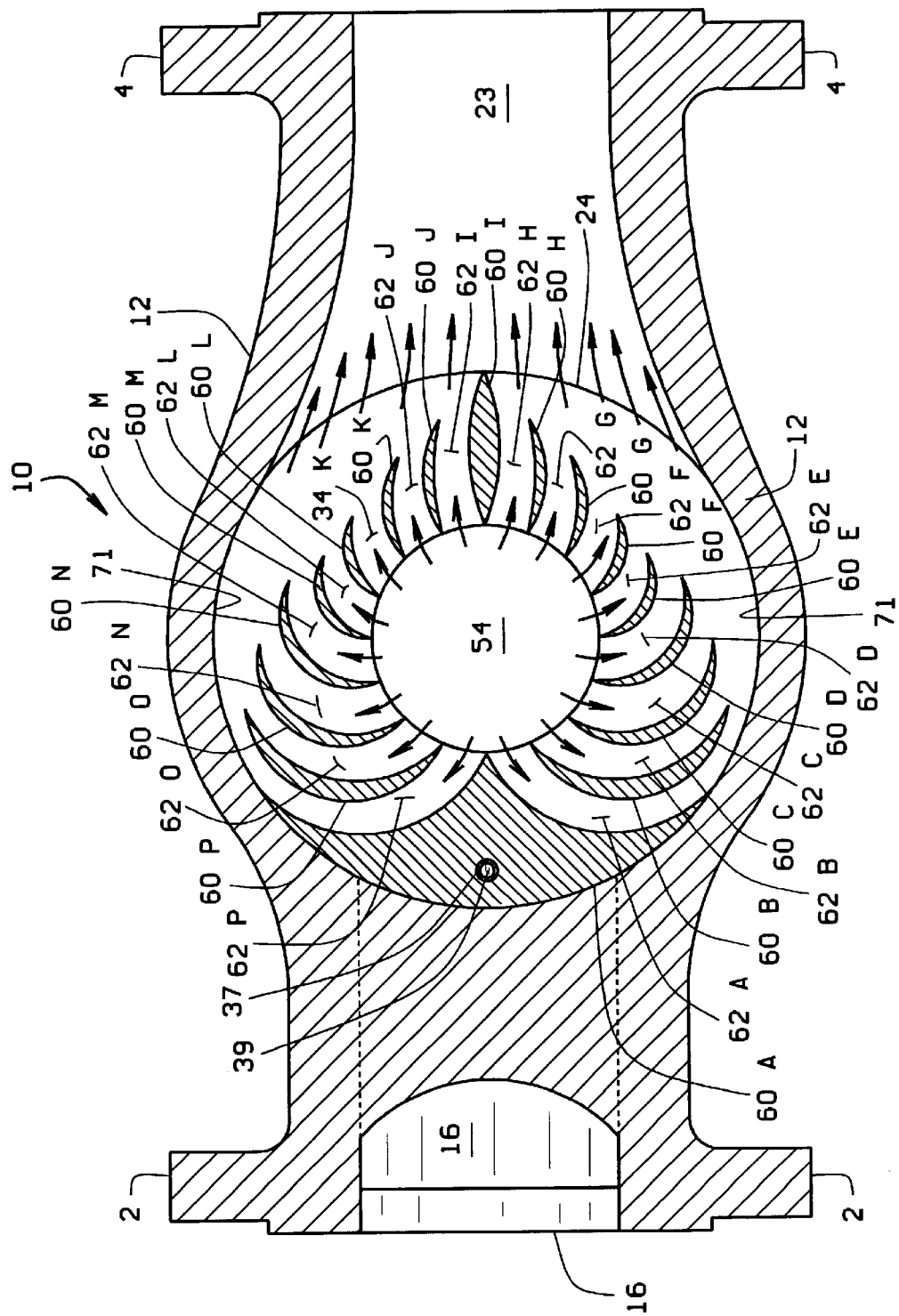
FIG. 11 is an enlarged cross-section view along line 11—11 of FIG. 1 with the diaphragm removed and arrows showing the flow patterns through the diffuser.

FIG. 11 is a section view of the regulator 10 along the line 11—11 of Figs. The diaphragm regulator is shown in the open position and for illustrative purposes, the diaphragm 20 is not shown in this drawing. The flow path of the fluid molecules is shown by the flow arrows. Fluid enters the diaphragm regulator 10 at the inlet port 16, moves past the inlet 25 and the seat 22 and is urged by the diaphragm 20 into the inlet zone 54. The fluid then moves from the inlet zone 54 as indicated by the plurality of arrows into the passageways 62a–62p. The exit of each passageway is oriented more or less parallel to the exit of the adjacent passages to reduce turbulence in the fluid as it moves into the transition zone 23. The smooth curvilinear passageways 62a–p, the parallel orientation of the exit of each passageway, and the shape of the transition zone 23 all contribute to laminar fluid flow as it exits the outlet port 18.

The curvilinear vanes 60a–60p guide the fluid molecules as they move from the inlet port 16 to the transition zone 23 to the outlet port 18, thereby reducing turbulence. Reduction of turbulence reduces noise and impingement on wall portion 71 of body 12 and other problems well known in the industry.

All of the passageways 62a–62p are curvilinear, but some are more pronounced than others. Molecules passing through the passageways will be redirected in the following approximate ranges from the center of the inlet zone 54.

| Passageway | Degree of redirection |
| --- | --- |
| 62 a&p | 157.5°–180° |
| 62 b&o | 135°–157.5° |
| 62 c&n | 112°–135° |
| 62 d&m | 90°–112° |
| 62 e&l | 67.5°–90° |
| 62 f&k | 45°–67.5° |
| 62 g&j | 22.5°–45° |
| 62 h&i | 0°–22.5° |

Vanes 60b–60h and 60j–p have two concave exterior surfaces, one having a larger radius than the other. Vane 60i is formed with concave and convex exterior surfaces having the same radius. The rear vane 60a has a semicircular rear exterior surface sized and adapted to fit in the circular housing 70. The rear vane 60a also has two concave exterior surfaces shaped generally like a bird's wing, which, in conjunction with adjacent vanes, 60b and 60p, define the flow passageways 62a and 62p. The rear vane 60a has an aperture 37 sized to receive and engage on alignment pin 39 that protrudes from body 12 into housing 70 to property orient the diffuser 36 and thus the flow passages 62a–62p with the transition zone 23.

Where each vane contacts the inlet zone 54, it is formed in a sharp streamlined leading edge to reduce turbulence. The opposite end of each vane is formed into a sharp streamlined trailing edge to reduce turbulence.

Figure 12:
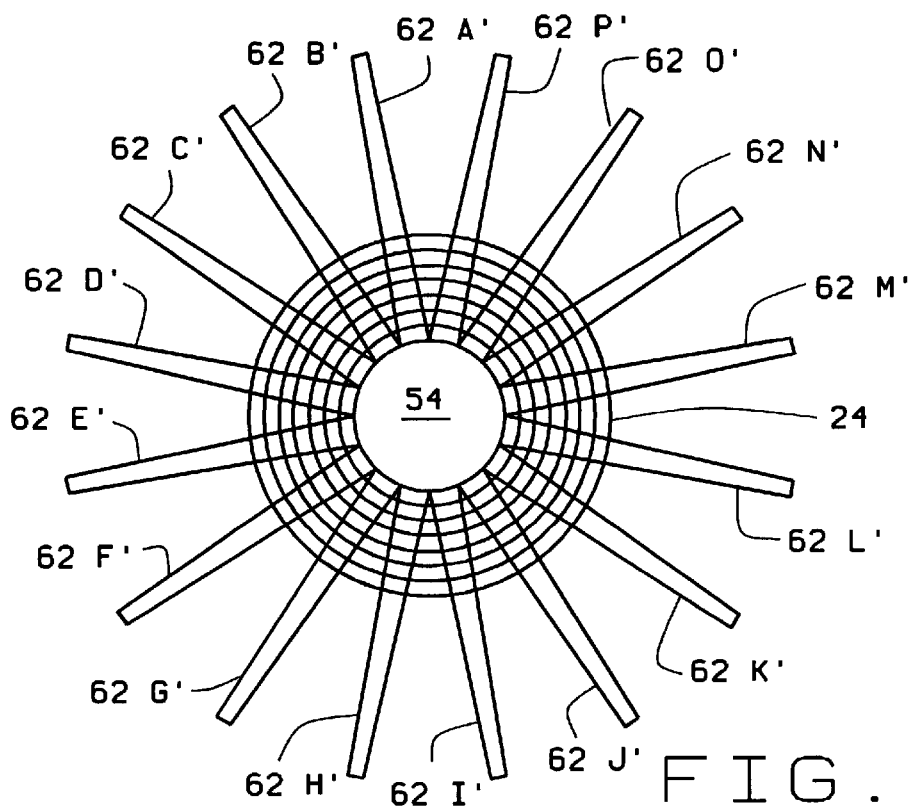
FIG. 12 is a geometric representation of the outlet passages of the flow diffuser, without convergence.
Figure 13:
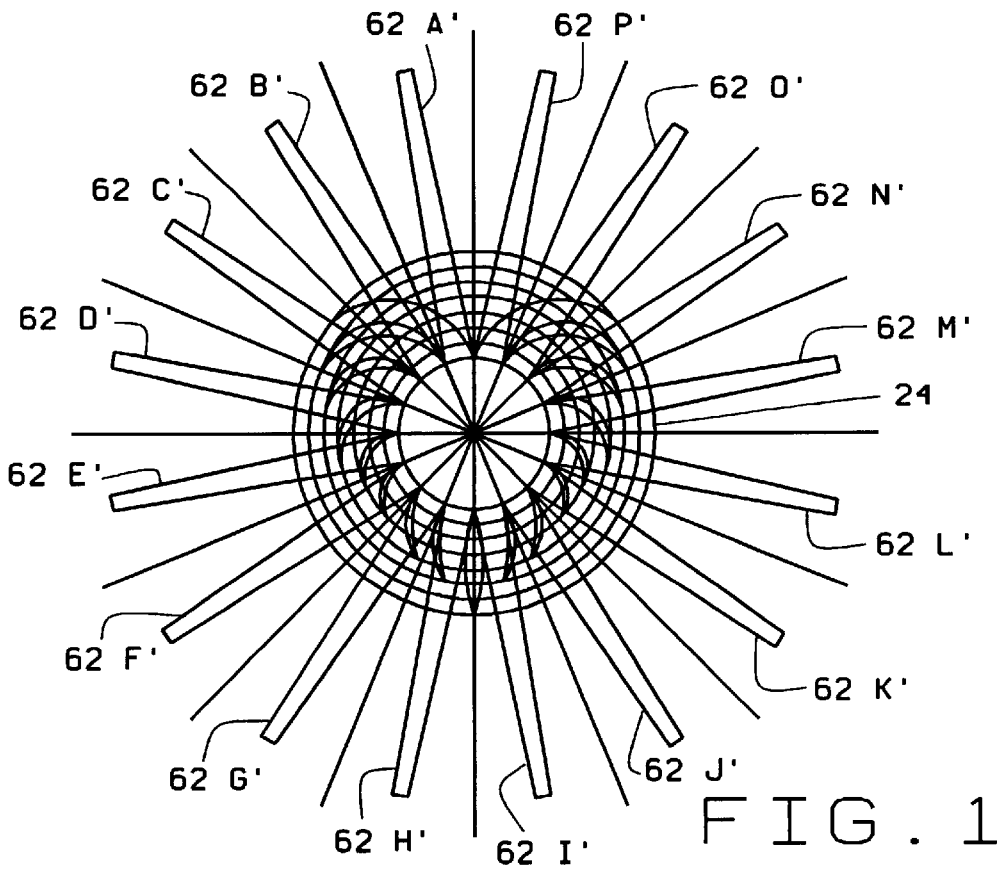
FIG. 13 is a geometric representation of the outlet passages of the flow diffuser, after convergence.

The shape of the vanes 60a–p is defined, as shown in FIGS. 12 and 13. To determine the shape of the vanes 60a–p, virtual representations of outlet passages 62'a–p are drawn as extending straight from the inlet zone 54. The number of the outlet passage representations 62' may vary but sixteen (16) is shown in this drawing. Of course, it should be noted that the number of outlet passage representations 62'a–p will be equal to the number of actual outlet passages 62'a–p in the flow diffuser 36. Each outlet passage representation 62'a–p should touch the adjacent outlet passage representations 62'a–p at the start. At an arbitrary distance from the start, each outlet passage representation 62'a–p should be reduced in width so that the total combined flow area out of the outlet passage representations 62'a–p is equal to the total flow area of the inlet 25. If the height of the outlet passages 62'a–p at the end thereof, is one half the diameter of the inlet 25, each outlet passage representation 62'a–p should be half as wide at the end as at the start.

Each outlet passage representation 62'a–p is bent toward the original flow direction, until it converges with the adjacent outlet passage representation 62a–p. Since the outlet passage representation 62'a–p narrows as it progresses, this bending causes gaps to form. These gaps define the vanes 60a–p. The remaining spaces between the vanes are the actual outlet passages 62a–p. It should be readily seen that the number of vanes 60a–p is equal to the number of outlet passages 62a–p.

Once the shape of the vanes 60 are determined, the flow diffuser 24 can be created by precision casting (lost wax method), a method well known in the art of metallurgy. The flow diffuser 24 may be removed from the circular housing 70 of the regulator 10, and therefore replaced if necessary.

Figure 14:
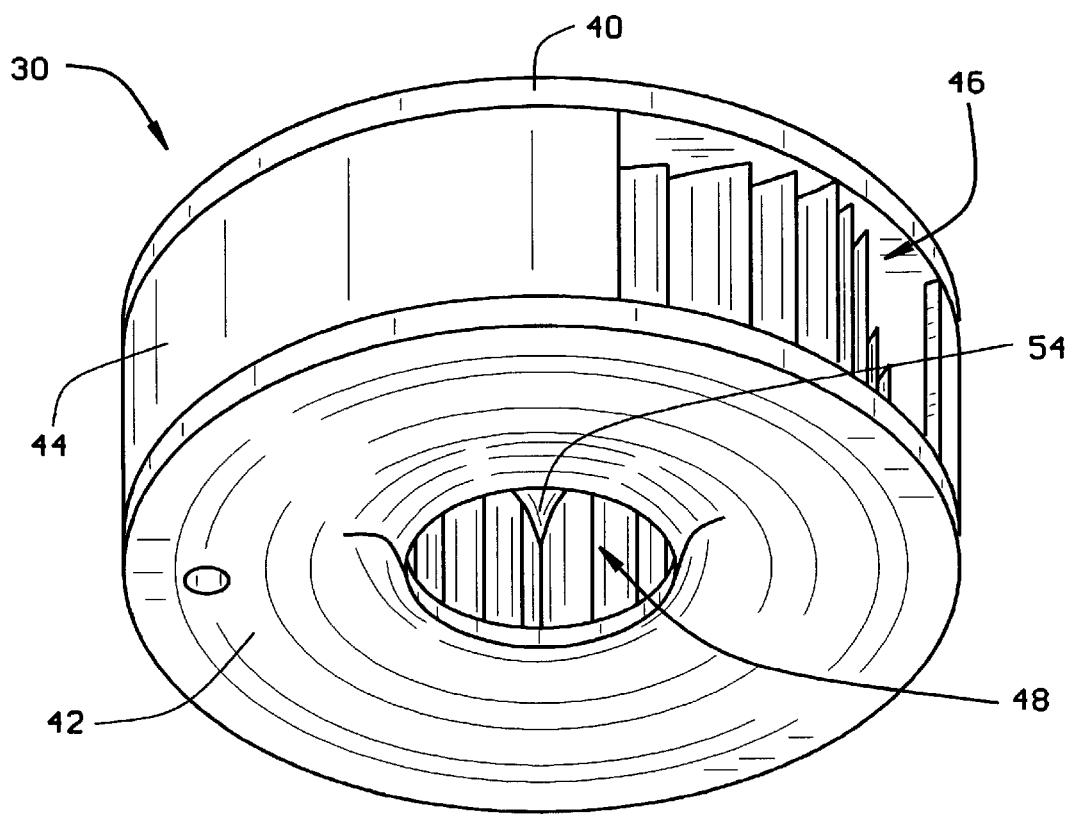
FIG. 14 is an enlarged section view of an alternative embodiment of the flow diffuser with a flow restrictor, the diaphragm shown in the closed or no-flow position.

FIG. 14 is an enlarged section view of an alternative embodiment of the flow diffuser 100 with a flow restriction element 110. In this drawing, the diaphragm 20 of the regulator 10 is shown in the closed or no-flow position. Flow restrictors are commonly used in diaphragm regulators in particular applications when a restricted flow is required. The flow restriction element shown in FIGS. 14, 15 and 16 has approximately a 60% restriction. Depending on the application, the amount of restriction can be more or less.

The body 12 includes a circular housing 70 that receives the modified flow diffuser 100. The modified diffuser 100 includes a circular recessed 110 that receives the flow restriction element 102. A perspective view of the flow restriction element 102 is shown in FIG. 16.

The collar 101 has a notch 103 that receives the upper rim 106 of the flow restriction element 102. In all other respects, the regulator 10 in this drawing is identical to the regulator shown in FIGS. 2 and 3. The body 12 receives a dome 14 which traps the diaphragm 20 with the collar 101. In the middle of the dome 14 is a piston 24 and a spring 30. A plurality of passageways 48 allow fluid communication between the chamber 34 and the chamber 50. A nut 27 engages a threaded bolt 26 which is positioned in the apex of the diaphragm 20. The nut 27 and the bolt 26 secure the diaphragm 20 to the piston 24.

Figure 15:
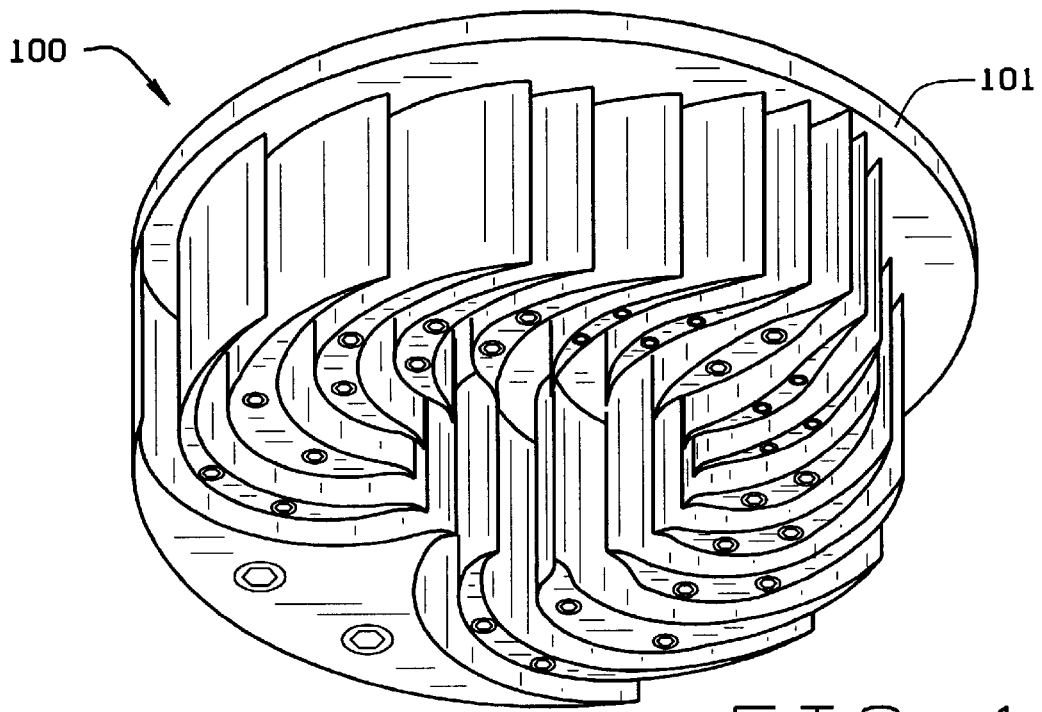
FIG. 15 is an enlarged section view of an alternative embodiment of the flow diffuser of FIG. 14, the diaphragm shown in the open position.

FIG. 15 a section view of the flow diffuser 100, as shown in FIG. 14 except the regulator 10 is in the open position in FIG. 15. Fluid flows from the inlet 25 past the diaphragm 20 through the plurality of holes 104 in the flow restriction element 102 into the passageways 62a–p of the flow diffuser 100 and into the transition zone 23 as shown by the flow arrows in this drawing. The diaphragm 20 is supported by and contacts a portion of the inner surface 105 of the flow restriction element 110. As discussed previously, the diaphragm 20 modulates up and down thus regulating downstream pressure P2.

Figure 16:
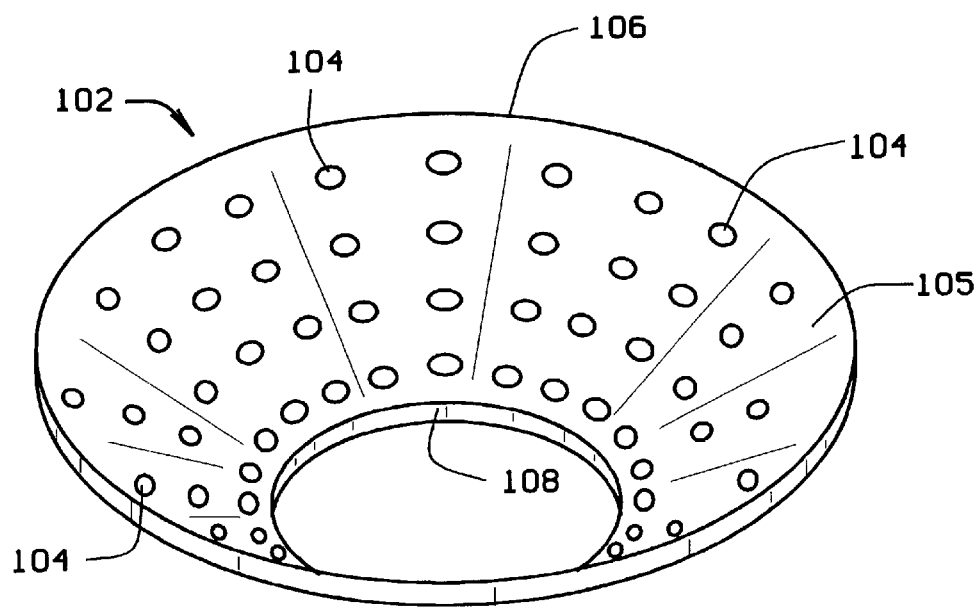
FIG. 16 is a perspective view of the flow restrictor of FIG. 14 and 15.

FIG. 16 is an enlarged perspective view of the flow restriction element 102. The flow restriction element includes a plurality of holes 104 which allow fluids to pass through the flow restriction element 102 and into the passageways 62a–p of flow diffuser 100. The flow restriction element 102 includes a top circular rim 106 and a bottom circular rim 108. The flow restriction element 102 further includes an inner surface 105 which sometimes is in contact with the diaphragm 20.

Figure 17:
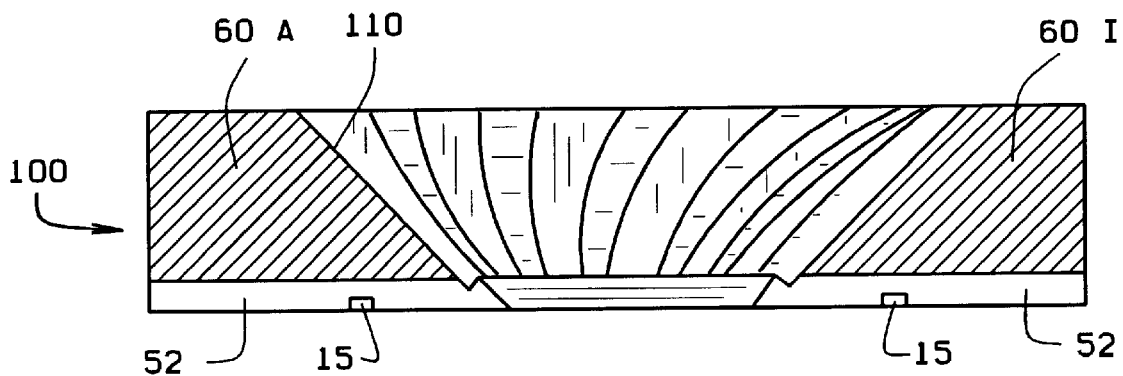
FIG. 17 is a section view of the alternative embodiment of the flow diffuser that receives the flow restrictor of FIG. 17.

FIG. 17 is a section view of the alternative embodiment of the flow diffuser 100 that receives the flow restriction element 102 of FIG. 16. FIG. 17 is a section view of the alternative embodiment of the flow diffuser 100 taken along the mid line such that vanes 60a and 60i are bisected. A recess 110 is formed in the flow diffuser 100 to receive the frustro-conical flow restriction element 102 of FIG. 16. An o-ring groove 15 is formed in the base 52 of the flow diffuser 100 in an identical manner to the flow diffuser 36. The o-ring groove 15 receives the o-ring 17 previously discussed. The alternative embodiment flow diffuser 100 and the first flow diffuser 36 are both removable and are circular in configuration. The removable flow diffusers 100 and 36 fit in the circular housing 70 of the body 12 of the flow regulator 10.

To remove either of the flow diffusers, the bolts 13 are removed and the dome 14 is taken off the body 12. The spring 30, the piston 24 and the diaphragm 20 are then removed from the apparatus. The collar 21 or 101 is then removed allowing access to the circular housing 70. The flow diffuser 36 or the flow diffuser 100 can then be removed from the circular housing 70 and replaced as needed.

While the foregoing is directed to the preferred embodiments of the present invention, other and further embodiments of the invention may be devised without departing from the basic scope thereof, and the scope thereof is determined by the claims which follow.

What is claimed is:

1. A diaphragm regulator comprising:
   a body having an inlet port, an inlet, a housing, transition zone and an outlet port;
   a flow diffuser positioned radially around the inlet so as to capture the entirety of any fluid flow entering the inlet port, the diffuser removably positioned in the housing;
   a seat positioned between the inlet port and the outlet port;
   a conical diaphragm retractably positioned to seal on the seat, the diaphragm preventing the flow of fluid when contacting the seat and when retracted from the seat, regulating fluid pressure in the outlet port and flow of fluid through the regulator;
   said flow diffuser including;
   i. a flat circular base with an inlet zone in the center;
   ii. a plurality of vanes connected to the base and extending from the inlet zone to the outer circumference of the base;
   iii. said vanes spaced apart from each other to define a plurality of flow passageways permitting fluid to flow from the inlet zone through the passageways through the transition zone and exit the outlet port, some of said passageways having a curvilinear shape; and
   iv. each of said vanes having a flat upper surface parallel with the base and an inclined surface sloping downward from the flat upper surface to the inlet zone, the inclined surface making continuous contact with the diaphragm when the diaphragm is positioned against the seat.

2. The apparatus of claim 1, further including a recess in the flow diffuser sized and arranged to receive a conical flow restriction element.

3. The apparatus of claim 1, wherein the angle of said inclined surface of said vanes is complimentary to the angle of the conical diaphragm when contacting the seat.

4. The apparatus of claim 1, wherein the angle of said inclined surfaces of said vanes is between 30° and 50°.

5. The apparatus of claim 1, wherein the angle of said inclined surfaces of said vanes is 45°.

6. The apparatus of claim 1, wherein some of the passageways redirect fluid flow more than 90° from the inlet zone to the transition zone.

* * * * *